United States Patent [19]

McClure

[11] Patent Number: 4,579,272
[45] Date of Patent: Apr. 1, 1986

[54] BOILER PIPE TOOL FOR HELIARC WELDING

[76] Inventor: Gary W. McClure, Rte. 7, Box 228-A, South Charleston, W. Va. 25309

[21] Appl. No.: 574,624

[22] Filed: Jan. 27, 1984

Related U.S. Application Data

[63] Continuation-in-part of Ser. No. 400,134, Jul. 20, 1982, Pat. No. 4,493,139.

[51] Int. Cl.$^4$ ............................................. B23K 37/04
[52] U.S. Cl. ................................................... 228/49.3
[58] Field of Search ................... 228/44.5, 49 B, 212, 228/27; 219/60 R, 61, 161, 59.1; 29/272, 271

[56] References Cited

U.S. PATENT DOCUMENTS

| | | | |
|---|---|---|---|
| 1,140,115 | 5/1915 | Carson | 254/255 |
| 2,638,676 | 5/1953 | Callahan | 29/271 |
| 2,793,424 | 5/1957 | Witte | 29/237 |
| 3,284,883 | 11/1966 | Haverfield et al. | 228/498 |
| 3,422,519 | 1/1969 | Fehlman | 228/44.5 X |
| 3,512,229 | 5/1970 | Phariss | 219/161 X |
| 3,705,453 | 12/1972 | Olson | 228/44.5 X |
| 3,718,798 | 2/1973 | Randolph et al. | 228/27 X |
| 3,894,326 | 7/1975 | Merriman | 228/49.3 X |
| 3,901,497 | 8/1975 | Dearman | 228/44.5 X |

FOREIGN PATENT DOCUMENTS 0199696  11/1983  Japan .

Primary Examiner—Nicholas P. Godici
Assistant Examiner—Carmine Cuda
Attorney, Agent, or Firm—Harvey B. Jacobson

[57] ABSTRACT

A tool for positioning and retaining boiler pipe sections in aligned, spaced relation enabling the boiler pipe sections to be joined by heliarc welding incorporating a split block having opposed recesses therein which cooperate to define a passageway that is open at one side for receiving the adjacent ends of boiler pipe sections to retain the boiler pipe sections in alignment together with a spacing arrangement engaged with the opposed ends of the boiler pipe sections to retain the adjacent ends in adjustably spaced adjacent relation to enable heliarc welding of a portion of the adjacent ends of the boiler pipe sections. After the initial heliarc welding process has been completed around a portion of the periphery of the boiler pipe sections, the block is removed and the heliarc welding is completed around the periphery of the boiler pipe sections with the radial depth of the heliarc welding being substantially less than the radial thickness of the boiler pipe sections thus leaving a peripheral groove which is filled with conventional resistance-type welding material using conventional welding techniques. The tool also includes an overcenter pulling device to pull the boiler pipe sections into aligned adjacent relation so that the block can be associated with the adjacent boiler pipe sections.

8 Claims, 7 Drawing Figures

BOILER PIPE TOOL FOR HELIARC WELDING

CROSS REFERENCE TO RELATED APPLICATION

This application is a continuation-in-part of copending application Ser. No. 400,134, filed July 20, 1982, for BOILER PIPE ASSEMBLY TOOL now U.S. Pat. No. 4,493,139, issued Jan. 15, 1985.

BACKGROUND OF THE INVENTION

1. Field of the Invention

The present invention generally relates to a tool for use in repairing or replacing boiler pipes and more particularly a tool which enables adjacent ends of boiler pipe sections to be moved into adjacent, spaced aligned relation and positively maintained in an accurately spaced and aligned relation while the boiler pipe sections are joined initially by a heliarc welding process which eliminates the problem of welding material becoming deposited interiorly of the passageways in the boiler pipe sections and eliminates the introduction of a chill ring between the boiler pipe sections which introduces a flow restriction. The tool also enables the connection between the boiler pipe sections to be completed by conventional welding techniques after the heliarc welding process has been completed peripherally of the boiler pipe sections to a radial thickness substantially less than the radial thickness of the joined boiler pipe sections.

2. Description of the Prior Art

The prior patents, known to applicant, are listed as follows: U.S. Pat. Nos. 333,577, Jan. 5, 1886; 870,931, Nov. 12, 1907; 1,140,115, May 18, 1915; 1,518,769, Dec. 9, 1924; 2,793,424, May 28, 1957; 2,940,267, June 14, 1960.

While tools for pulling members toward each other with an over center pulling device are generally well known and devices for holding workpieces while work is performed, including welding operations, are well known, the prior patents do not disclose structures equivalent to this invention.

SUMMARY OF THE INVENTION

An object of the present invention is to provide a tool to facilitate the joining of boiler pipe sections by utilizing a heliarc welding process including an alignment and spacing block bridging the juncture between adjacent boiler pipe sections and a pulling tool to pull the adjacent pipe sections into aligned adjacent relation.

Another object of the invention is to provide a tool in accordance with the preceding object in which the aligning and spacing block is in the form of a split block having oppositely facing recesses of generally partial cylindrical configuration to engage and receive peripheral portions of adjacent boiler pipe sections with the block being split longitudinally and secured together by clamp bolts to enable assembly of the block onto the pipe sections with the recesses in the components of the block cooperating to engage more than one-half of the circumference of the boiler pipe sections.

A further object of the invention is to provide a tool in accordance with the preceding objects in which the components of the block each have an adjustable spacer engaging the chamfered ends of the boiler pipe sections to enable the space between the adjacent ends of the boiler pipe sections to be varied so that optimum spatial relationship may be obtained for more effective utilization of a heliarc welding process to connect the boiler pipe sections together without depositing welding material interiorly of the pipe sections and without causing any flow restriction with the heliarc welding extending only from the inner periphery of the pipe sections for a very short radial distance so that the major portion of the groove formed between the adjacent pipe sections by the heliarc welding process will be completed by a conventional resistance-type welding operation thereby facilitating the joining of boiler pipe sections without the use of chill rings and other inserts which introduce flow restrictions interiorly of the pipes.

Still another object of the invention is to provide a tool in accordance with the preceding objects in which the pulling tool includes a pair of laterally opening generally C-shaped members engaging the adjacent boiler pipe sections and an overcenter manually operated toggle structure having the ends thereof radially adjustably connected to the pipe engaging members in order to enable adjacent boiler pipe sections to be pulled toward each other and aligned.

A still further object of the invention is to provide a tool in accordance with the preceding objects which is simple in construction, easy to use, effectively used in restricted areas interiorly of boilers and facilitates the use of heliarc welding followed by resistance welding in connecting boiler pipe sections together.

These together with other objects and advantages which will become subsequently apparent reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENT

Figure 1:
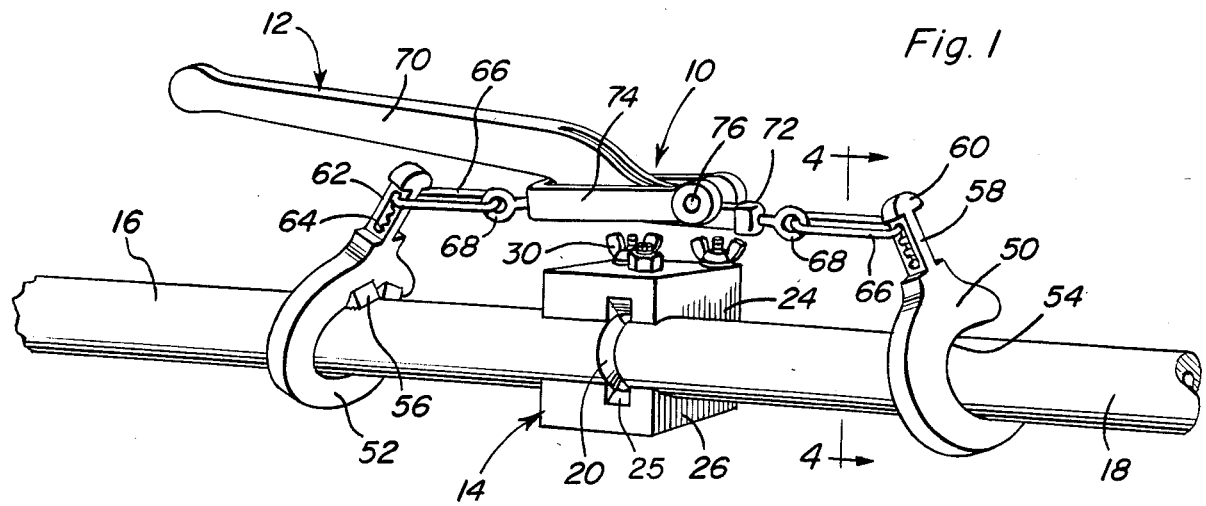
FIG. 1 is a perspective view of the tool of the present invention illustrating the assembly of the pulling tool with the adjacent boiler pipe sections and the aligning and spacing block with the adjacent boiler pipe sections.

Referring now specifically to the drawings, the tool of the present invention is generally designated by the numeral 10 and includes a pulling tool generally designated by the numeral 12 and a spacing and aligning block generally designated by the numeral 14 for aligning and connecting adjacent boiler pipe sections 16 and 18 in rigid alignment to enable replacement, repair and the like of boiler pipes interiorly of boiler shells and the like. As illustrated, the adjacent ends of the boiler pipe sections 16 and 18 are bevelled or chamfered as at 20 which is conventional procedure and, as disclosed in my copending application, a chill ring is usually inserted interiorly of the boiler pipe sections which introduces a flow restriction in the interior flow passage 22 through the boiler pipe sections 16 and 18. When such a chill ring is used, conventional resistance-type welding techniques are employed. If the chill ring is not used when conventional resistance-type welding techniques are employed, welding material from the welding rod will be deposited interiorly of the flow passage 22 thus not only introducing flow restriction but also the possibility of such material being moved with fluid through the flow pasage 22.

Figure 2:
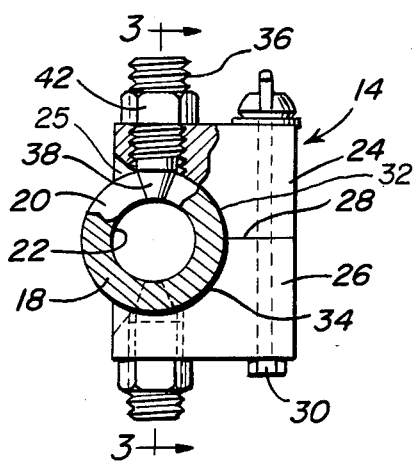
FIG. 2 is an end view of the block illustrating the association of the components thereof with the boiler pipe sections.
Figure 3:
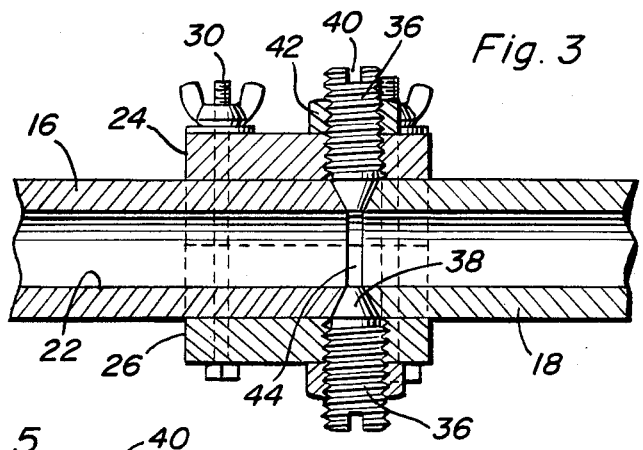
FIG. 3 is a longitudinal, sectional view taken substantially upon a plane passing along section line 3—3 on FIG. 2 illustrating the structural details of the block and the adjustable spacer members mounted thereon.

The spacing and alignment block 14 includes a pair of block members 24 and 26 having a line of abutment and separation 28 therebetween with a pair of through bolts 30 adjacent one edge portion thereof to secure the block members 24 and 26 in abutting engagement. The opposite edge portions of the block members 24 and 26 include partially cylindrical recesses 32 and 34 which extend around and engage a portion of the periphery of the boiler pipe sections 16 and 18 as illustrated in FIG. 2 with the two recesses 32 and 34 cooperating to extend around and engage more than one-half of the circumference of the boiler pipe sections 16 and 18 so that when the surfaces 28 abut, the block 14 will be securely engaged with the boiler pipe sections 16 and 18 and maintain them in alignment. By loosening the bolts or clamp screws 30, the block members 24 and 26 may be separated for assembling the block 14 onto the pipe sections 16 and 18. Each of the block members 24 and 26 is provided with a screw threaded spacer member 36 having a truncated cone-shaped inner end 38 which extends inwardly of the recess 32 or 34 and between the chamfered ends 20 of the boiler pipe sections 16 and 18 as illustrated in FIG. 3. The outer end of the screw member 36 is provided with a slot or kerf 40 for receiving a screwdriver or it may be constructed of polygonal configuration to receive a wrench or the like in order to adjust the conical end 38 radially in relation to the pipe sections. A lock nut 42 is provided on the screw member 36 to lock the screw member 36 in radially adjusted position. As illustrated, the radially adjustable screw members 36 and the conical ends 38 are oriented along the center line of the pipe so that adjustment of the opposed conical ends 38 serve as adjustable spacers to vary the space 44 between the ends of the pipe sections 16 and 18 so that a heliarc welding process designated by numeral 46 may be provided to fill the space 44 partially around the circumference with the other circumferential portion of the space 44 being left unfilled by the heliarc welding process thus leaving a groove which is completely filled by a conventional resistance welding operation.

Figure 4:
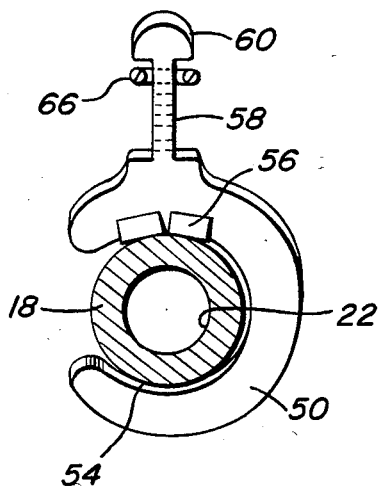
FIG. 4 is a sectional view taken substantially upon a plane passing along section line 4—4 on FIG. 1 illustrating the structure of one of the C-shaped pipe engaging members used in the pipe pulling tool.
Figure 5:
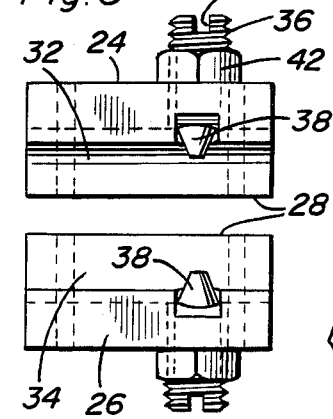
FIG. 5 is an exploded side elevational view of the two components of the block.
Figure 6:
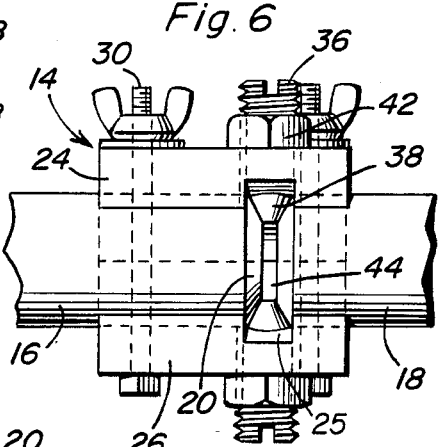
FIG. 6 is side elevational view of the block.
Figure 7:
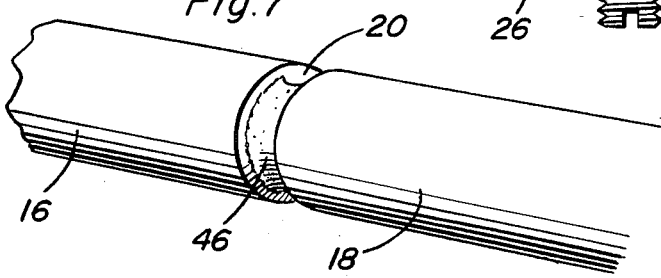
FIG. 7 is a perspective view illustrating the adjacent ends of boiler pipe sections partially joined by heliarc welding illustrating the groove which is left exteriorly of the heliarc welding which is completed by conventional resistance welding.

The pulling tool 12 is similar to that disclosed in the copending application and includes a pair of substantially C-shaped pipe engaging members 50 and 52 each of which is provided with a lateral opening 54 to enable it to be placed laterally onto the pipe sections 16 and 18 with gripping inserts 56 at the upper inner portion of the recess 54 to grippingly engage and bite into the pipe sections 16 and 18 as illustrated in FIGS. 1 and 4. Each of the C-shaped members 50 and 52 includes an upwardly extending shank 58 having an enlarged head 60 thereon to facilitate handling and a slot 62 having notches 64 in the inner surface thereof which adjustably receives one end of an elongated chain link 66 having its other end attached to an eye member 68 with one of the eye members 68 being attached at one end of an elongated handle 70 having an offset end portion 72 pivotally attached to a U-shaped yoke 74 by pivot pin 76 with the other end of the yoke 74 being connected to the other eye 68 with the association of these components being such that when the handle 70 is swung in one direction, the chain links 66 will be moved apart and when swung in the other direction they will be pulled together with the pivot axis 76 passing over a line extending between the points of connection with the chain links. Thus, the pulling tool 12 is used to pull the boiler pipe sections together and also to bring them into an alignment condition with the block 14 securing the ends of the pipe sections 16 and 18 in accurate alignment and accurate spaced relation with adjustment of the screw members 36 providing adjustment of the space 44 between the pipe sections. Also, each of the block members 24 and 26 is recessed or relieved as at 25 to enable the heliarc welding process 46 to commence adjacent the conical ends 38 of the screw member 36 thereby assuring that the pipe sections 16 and 18 are securely connected by the heliarc welding 46 after which the block 14 may be removed for completion of the heliarc welding about the circumference of the pipe sections.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A boiler pipe tool comprising a pulling device for engaging and pulling adjacent boiler pipe sections into adjacent aligned relation to enable adjacent ends thereof to be connected, and a spacing and aligning block engaging the adjacent ends of adjacent boiler pipe sections and retaining them accurately in aligned and closely spaced relation to enable the adjacent ends of the pipe sections to be heliarc welded, said block including two block members, means detachably securing the block members together, each block member including a partial cylindrical recess engaging the periphery of adjacent boiler pipe sections in bridging relation to adjacent ends thereof with the two recesses cooperating to extend to an edge of the block and around more than one-half but less than the entire circumference of the boiler pipe sections for retaining the boiler pipe sections in alignment in such a manner that a portion of the adjacent ends of the boiler pipe sections protrudes outwardly from the edge portion of the block with the diameter of the pair of recesses being substantially the same as the external diameter of the boiler pipe sections thereby accurately aligning the adjacent boiler pipe sections, each of said block members including a screw threaded member having a conical inner end extending into the recess with the inner ends being in opposed relation for positioning between adjacent ends of adjacent boiler pipe sections for spacing the pipe sections adjustably from each other.

2. The structure as defined in claim 1 wherein the adjacent ends of the boiler pipe sections are bevelled for receiving the conical inner ends, each of the block members being relieved between the inner ends of the screw threaded members and the periphery of the block members to enable heliarc welding over substantially one-half of the diameter of the adjacent pipe sections with the heliarc welding connecting the pipe sections peripherally and terminating radially inwardly of the pipe sections.

3. The structure as defined in claim 2 wherein said pulling device includes a pair of laterally opening C-shaped members engageable with the boiler pipe sections in spaced relation to the adjacent ends thereof, and an over center adjustable toggle-type take-up device connecting the C-shaped members for moving the pipe sections into adjacent relation with the C-shaped members moving the pipe sections into alignment.

4. The structure as defined in claim 3 wherein the connection between the C-shaped members and toggle device is adjustable to vary the orientation of the pipe sections for alignment.

5. The structure as defined in claim 4 wherein each of said C-shaped members includes projections on the edge thereof adjacent the connection with the toggle device to bite into the adjacent boiler pipe sections.

6. The structure as defined in claim 1 wherein each of said block members includes an abutting surface extending laterally from at least one longitudinal edge of the recess, said means detachably securing the block members together including means associated with the block members laterally of the recesses for securing the abutting surfaces in abutting relationship.

7. The structure as defined in claim 6 wherein each of said screw threaded members includes a conical tip engaged with bevelled ends on adjacent pipe sections whereby radial adjustment of the screw threaded members will vary the spaced relation between adjacent ends of the boiler pipe sections.

8. The structure as defined in claim 7 wherein said recesses are offset laterally with respect to the center of the block members and each of said block members having a lateral notch in the edge thereof communicating with the recess in alignment with the inner ends of the screw threaded members to provide access to the adjacent ends of the boiler pipe sections for enabling access thereto for heliarc welding the adjacent ends of the boiler pipe sections together around a portion of the periphery between the inner ends of the screw threaded members, said means securing the block members together including fastening bolt means extending through the block members for retaining them in assembled relation.

* * * * *